United States Patent Office 2,821,484
Patented Jan. 28, 1958

2,821,484

TEMPERATURE-STABLE WAXES FOR WAX PASTE

Helmut Kolling, Duisburg-Hamborn, and Friedrich Rappen, Oberhausen-Sterkrade, Germany, assignors to Ruhrchemie Aktiengesellschaft, Oberhausen-Holten, Germany, a corporation of Germany No Drawing. Application March 30, 1954
Serial No. 419,918

Claims priority, application Germany April 1, 1953

8 Claims. (Cl. 106—270)

This invention relates to temperature-stable waxes for wax paste.

Large quantities of natural and synthetic waxes are used for the production of wax paste polishes, as, for example, floor-polishing agents, polishing pastes, leather dressings, boot polishes, and similar wax paste. The wax paste, after application, must leave a film on the surface treated, which is hard, durable, and glossy. The wax used for the production of wax paste of this type must have a high capacity for absorbing oil. In addition, the wax paste must have as low as possible a sensitivity to temperature changes, and the capacity for oil absorption must be as independent as possible of the temperature. A wax paste having this quality will be referred to hereinafter as a temperature-stable wax paste.

In general, the wax paste formulations produced by the polish industry contain about 70% solvent and 30% wax constituents. The solvent used in most cases is a mixture of solvent naphtha, i. e., a naphtha fraction boiling between 130 and 190° C. and turpentine. The wax constituents generally consist of 60–80% of low-cost slab paraffin, and, in addition, contain high-grade waxes which impart the particular property desired for the wax paste. The high-grade waxes used for this purpose include ozocerite, carnauba wax, montan wax or synthetic waxes. The synthetic waxes are generally obtained from montan wax and consist of wax acids or wax esters.

Wax acids have been produced by chlorinating hydrocarbons containing more than 25 carbon atoms in the molecule, and preferably produced by the catalytic hydrogenation of carbon monoxide; converting the chlorinated hydrocarbons into olefin-containing hydrocarbon mixtures by splitting off hydrogen chloride; catalytically reacting the mixtures with carbon monoxide and hydrogen-containing gas at elevated pressure and temperature in accordance with the Oxo synthesis; hydrogenating the mixture after the Oxo synthesis to form mixtures of alcohols and hydrocarbons, and converting these mixtures of alcohols and hydrocarbons into mixtures of wax and paraffins by treatment with melted alkali and mineral acids.

The chlorination of the starting material is preferably effected in such a manner that the hydrocarbons to be processed are heated somewhat above their melting point and thereafter chlorine is introduced into the liquid mass while stirring. In doing so, radiation may be of advantage. The degree of chlorine addition should generally not exceed 1 gram atom chlorine per mol hydrocarbon.

The splitting off of hydrogen chloride is effected in a vessel provided with a stirrer by heating the chlorinated products from 1 to 2 hours at 300° C. It is expedient to simultaneously pass small amounts of nitrogen through the reaction mixture. Moreover, the addition of small amounts of active carbon, of, for example, 1–2%, is of advantage. The last traces of chlorine and chlorine compounds may be removed in the conventional manner by an after-treatment with zinc oxide and bleaching earth at about 200° C.

Water gas is then added to the olefin-containing hydrocarbon mixtures thus obtained under the conditions known per se of the Oxo synthesis. The aldehydes primarily formed thereby are converted into the corresponding alcohols by hydrogenation in the known manner. The Oxo synthesis is effected with the conventional cobalt-containing catalyst at reaction temperatures of 140–160° C. and gas pressures of 100–200 kg. per square centimeter. Of particular advantage is the use of aqueous cobalt salt solutions as the Oxo catalyst.

The hydrogenation of the primarily formed aldehydes may also be effected using cobalt-containing catalyst. However, other hydrogenation catalysts may also be used, as, for example, the conventional nickel catalyst. In the hydrogenation, a gas pressure of 50–200 kg. per square centimeter and a temperature of 120–220° C. are maintained. After the termination of the hydrogenation, the reaction product is filtered off from the catalyst.

The alcohols obtained are converted into the corresponding carboxylic acids by conventional treatment with molten alkali. The Oxo synthesis products may be treated for several hours at 300–370° C. with 100–150% of the theoretical quantity of NaOH or KOH. The reaction product obtained by the treatment with molten alkali is decomposed with mineral acid, preferably hydrochloric acid, and freed from the last residue of mineral acid by repeated boiling with water.

It is also possible to extract the reaction product from the alkali treatment with low molecular weight alcohols or ketones, as, for example, with methanol or acetone thereby dissolving out with a good efficiency the higher molecular weight soaps, while unchanged paraffin hydrocarbons remain as the extraction residue. Pure wax acids are obtained in this manner.

One object of this invention is the production of a new wax component for substantially temperature-stable wax paste from wax acid-paraffin mixtures. This, and still further objects will become apparent from the following description:

It has now been found that a new, excellent wax component for a substantially temperature-stable wax paste may be obtained from a wax acid-paraffin mixture having a molecular size of at least $C_{25}$, if the portion of wax acid thereof has been produced from paraffin hydrocarbons by chlorination, dehydrochlorination of the chlorination products, catalytic addition of water gas to the unsaturated hydrocarbon mixtures thereby formed, hydrogenation of the products obtained by the water gas addition, treatment of the hydrogenation products with molten alkali, and treatment of the products from the alkali treatment with mineral acids, and has been partially saponified with calcium. When using wax acid-paraffin mixtures having a molecular size of $C_{30}-C_{40}$, the acid portion must be neutralized with caustic lime to such an extent that the wax has a calcium soap content of approximately 10–20%. When using wax acid-paraffin mixtures having a molecular size of $C_{25}-C_{30}$, the acid portion must be neutralized with caustic lime to such an extent that the wax acid-paraffin mixture contains about 10–30% of calcium soaps and sufficient unsaponified wax acid-paraffin mixtures having a molecular size above $C_{30}$ must be admixed that 0.7–3 parts by weight of the wax acid-paraffin mixture having the molecular size of $C_{25}-C_{30}$ and partially neutralized with caustic lime is present per part by weight of the unsaponified wax acid-paraffin mixture. If mixtures containing wax acids and paraffins of the molecular size $C_{25}-C_{40}$ are used, the saponification with calcium must be effected to such an extent that the partially saponified wax acid-paraffin mixture has a content of lime soaps of more than 30% up to about 50% and, moreover, sufficient unsaponified wax acid-paraffin mixtures having a molecular size above $C_{30}$ must be added that 0.2 to 1 part by weight of the wax acid-paraffin mixture having the molecular size of $C_{25}$–$C_{40}$ and partially saponified with calcium is present per part by weight of the unsaponified wax acid-paraffin mixture having a molecular size of above $C_{30}$.

The partial neutralization of the wax acids with calcium is effected at temperatures of 100–150° C.

If the wax acid-paraffin mixture has a molecular size between about $C_{30}$ and $C_{40}$, the same, after neutralization with the calcium oxide to a calcium soap content of about 10–20%, may be directly used as a high-grade wax for producing a substantially temperature-stable wax paste. It is of advantage if the partially neutralized wax acid-paraffin mixture having a molecular size of $C_{30}$–$C_{40}$ has a paraffin content of about 50%. The wax paste so produced has the same paste hardness at 30° C. as at 20° C. In addition, these products have an appearance in the container of that of a paste with a smooth and glossy surface and with uniform consistency, and result in use in the formation of a high-gloss film on the surface being treated.

It may be of advantage to remove about 10–20% of the low-pour point constituents from the mixture prior to this partial neutralization. The removal of these undesirable portions may, for example, be effected by means of extraction, using suitable solvents, as, for example, hydrocarbons, such as hexane, chlorinated hydrocarbons, such as dichloro ethane, and preferably oxygenated carbon compounds, such as methanol or acetone. The extraction is preferably effected with short reaction periods and at temperatures below 60° C. It is generally sufficient to stir the wax acid-paraffin mixture being extracted for a short time with 2–5 times their quantity of solvent, and then to separate them by filtration from the extract.

The wax acid-paraffin mixture of the molecular size $C_{30}$–$C_{40}$, after partial neutralization of the acid with caustic lime, possesses such a high capacity for oil-absorption that it is even possible to add relatively large portions of wax acids or wax acid-paraffin mixtures, the molecular size of which ranges above $C_{40}$. While satisfactory wax paste cannot be produced merely from wax acid-paraffin mixtures having more than 40 carbon atoms, the admixture of these high-molecular weight wax acid-paraffin mixtures to the wax acid-paraffin mixture of the molecular size of $C_{30}$–$C_{40}$, which has partially been neutralized with calcium oxide, has the advantage that the mixture obtained has an increased hardness. In addition, the hardness and also the gloss of the wax film on the surface treated with the wax paste produced therefrom is considerably improved.

As paraffin hydrocarbons having a molecular size of $C_{30}$–$C_{40}$ are generally difficult to obtain, it is of great advantage for the production of high-grade wax pastes to use the easily obtainable paraffins of the molecular size of $C_{25}$–$C_{30}$ and paraffins having a molecular size of above $C_{30}$. Paraffins having from 25 to 30 carbon atoms in the molecule may, for example, easily be prepared by distillation from products of the catalytic carbon monoxide hydrogenation. Also, commercial slab paraffins prepared from petroleum or other sources have a molecular size of $C_{25}$–$C_{30}$. There are paraffins having more than 30 carbon atoms in the molecule, which are relatively easily producible. The so-called hard paraffins from carbon monoxide hydrogenation have this molecular size with the average number of carbon atoms in the molecule being approximately 45.

It is of particular advantage to effect the neutralization of the $C_{25}$–$C_{30}$ wax acid-paraffin mixture with CaO in such a manner that this wax portion contains about 10–30% of lime soap.

It may be of advantage to remove about 10–30% portions of low pour point from the $C_{25}$–$C_{30}$ wax acid-paraffin mixture before partially neutralizing the same with CaO. The extraction is effected with suitable solvents and preferably with oxygenated carbon compounds.

The mixing proportion of the partially neutralized $C_{25}$–$C_{30}$ wax acid-paraffin mixture and the wax acid-paraffin mixture having more than 30 carbon atoms in the molecule may vary within wide limits. 0.7 to 3 parts by weight of the $C_{25}$–$C_{30}$ wax acid-paraffin mixture partially neutralized with lime may be used per part by weight of the wax acid-paraffin mixture having more than 30 carbon atoms in the molecule.

The wax acid-paraffin mixture prepared from hard paraffins of the catalytic carbon monoxide hydrogenation and having an average molecular size of about $C_{45}$ may be used with particular advantage as the wax acid-paraffin mixture having a range of molecular sizes of above $C_{30}$.

Satisfactory and hard wax films are also obtained if the waxes used for the production of wax paste are such, the one component of which consists of the wax acid-paraffin mixtures having a molecular size of $C_{25}$–$C_{40}$ prepared in accordance with the invention and is neutralized with CaO to such an extent that the calcium soap content thereof ranges between 20 and 50%. A wax acid-paraffin mixture of the molecular size $C_{25}$–$C_{40}$ which has partially been saponified in this manner is fused together with sufficient unsaponified wax acid-paraffin mixture having a molecular size of above $C_{30}$ that 0.2 to 1 part by weight of the partially saponified wax component is present per part by weight of the unsaponified component.

In most instances, low pour point constituents need not be extracted from the wax acid-paraffin mixtures of the molecular size $C_{25}$–$C_{40}$ prior to the partial neutralization.

Wax pastes prepared according to the conventional specifications from waxes of the composition in accordance with the invention with the use of slab paraffins, solvent naphtha, and turpentine have the appearance in a container of a product with a smooth and glossy surface and with uniform consistency and are only slightly affected by temperature changes. Even at 30° C. these wax pastes are very hard and hardly give off oil. The waxes are light yellow. When applied, they form a hard glossy film.

The waxes in accordance with the invention are well compatible with other natural or synthetic waxes. Various other raw materials may therefore be used for formulating wax pastes.

The following examples are given by way of illustration and not limitation.

*Example 1*

A hard paraffin obtained by catalytic carbon monoxide hydrogenation, practically containing only hydrocarbons boiling above 460° C., having a solidification point of 98° C. and a penetration number of 1.1 was extracted with solvents in such a manner that a paraffin fraction remained which substantially contained only hydrocarbons having a solidification point of 70–75° C. corresponding to a carbon number range of $C_{33}$ to $C_{36}$. This fraction had a solidification point of 72° C. and a penetration number of 4.7. While being irradiated, it was chlorinated at about 90–100° C. until 7.8% chlorine had been absorbed. After the splitting off of hydrogen chloride and an after-treatment with zinc oxide and bleaching earth, there resulted an olefinic hydrocarbon mixture which contained 0.3% Cl and had a solidification point of 66° C. Catalytic addition of water gas and subsequent hydrogenation effected at 140–160° C. and at a pressure of 180–200 kg. per square centimeter with a cobalt catalyst, i. e., the conventional Oxo synthesis, resulted in a light yellow mixture, which, in addition to paraffin hydrocarbons, contained 55% of high molecular weight alcohols.

This alcohol mixture was stirred for 4 hours at 350° C. with 150% of the theoretically required quantity of caustic alkali. After the subsequent decomposition with dilute sulfuric acid, washing, and drying, there resulted a wax-acid-paraffin mixture which contained 55% wax acids. This wax-acid-paraffin mixture was treated with sufficient caustic lime to obtain a finished product which contained 45% paraffins, 35% free wax acids, and 20% lime soaps. The product thus formed had a solidification point of 69° C. and a penetration number of 2.8.

A paste was prepared from 6 parts by weight of the afore-mentioned wax-acid-paraffin mixture, which was partially saponified with lime, 24 parts by weight of slab paraffin (Compes type 201) and 70 parts by weight of a mixture containing 70% solvent naphtha (naphtha fraction boiling between 130 and 190° C.) and 30% American turpentine, and the hardness of this paste was determined at different temperatures. The determination was effected by means of a penetrometer, which, instead of the penetrometer needle normally used for the determination of the hardness of paraffins and waxes, was provided with a small steel ball of 17 mm. in diameter and 19 grams in weight. The paste hardness was recorded as the depth of penetration in units of 0.1 mm. with a duration of the test of 5 seconds. Increasing numbers (one unit=0.1 mm.) thus indicate an increasing softness of the paste.

The paste prepared in the manner described above showed the following values with the penetrometer ball used:

| Temperature, ° C | 20 | 25 | 30 |
|---|---|---|---|
| Penetration No | 1 | 2 | 6 |

*Example 2*

The wax-acid-paraffin mixture prepared in accordance with Example 1 was treated with caustic lime (CaO) in such a manner that the finished product contained 45% paraffin, 45% wax acids, and 10% calcium soaps. From this, in the manner described in Example 1, there was produced a wax paste which had the following hardness values:

| Temperature, ° C | 20 | 25 | 30 |
|---|---|---|---|
| Penetration No | 2 | 3 | 8 |

*Example 3*

A paraffin fraction obtained by extraction and containing all of the hydrocarbons having a solidification point of 75–80° C. corresponding to the molecular size of $C_{36}$–$C_{40}$, having a solidification point of 77° C. and a penetration number of 3.5, was chlorinated until 6.8% chlorine had been absorbed. After the splitting off of hydrogen chloride and the removal of the residual quantities of chlorine, there resulted an olefinic paraffin mixture which had an iodine number of 46, a solidification point of 70° C., and a chlorine content of 0.2%.

This olefin-containing hydrocarbon mixture was catalytically treated with water gas and hydrogen in the manner described in Example 1, and then separated from the catalyst by filtration. This resulted in a light yellow product which had a hydroxyl number of 62 and a solidification point of 73° C. This product was treated with alkali under the conditions set forth in Example 1. After the decomposition with dilute sulfuric acid, washing, and drying, there was obtained a wax-acid-paraffin mixture, which consisted of 39% paraffin and 61% wax acid. This mixture was treated with lime (CaO) until the finished product contained 40% wax acids, 39% paraffin, and 21% calcium soaps. The product had a solidification point of 74° C. and a penetration number of 2.2. The hardness of the wax paste prepared therefrom with slab paraffin and a mixture of solvent naphtha and turpentine had the following values:

| Temperature, ° C | 20 | 25 | 30 |
|---|---|---|---|
| Penetration No | 2 | 3 | 6 |

*Example 4*

The product obtained in accordance with Example 1 after the treatment with alkali was extracted for 20 hours at 50° C. with dichlorethane. After having distilled off the solvent, there remained a residue which had a neutralization number of 2. The residue which was insoluble in dichlorethane, after decomposition with dilute hydrochloric acid, washing, and drying, yielded a wax acid which still contained 3% paraffins, solidified at 68° C., and had a penetration number of 4.5.

This wax acid was stirred for 30 minutes at about 20° C. with 250% acetone, thereby extracting 14% of the acid and resulting in a light yellow extraction residue which solidified at 69° C. and had a penetration number of 2. It was stirred with lime until the finished product contained 20% calcium soaps. The product had a solidification point of 72° C. and a penetration number of 0.5. The wax paste prepared therefrom had the following hardness values:

| Temperature, ° C | 20 | 25 | 30 |
|---|---|---|---|
| Penetration No | 1 | 2 | 9 |

*Example 5*

A hard paraffin produced by the catalytic hydrogenation of carbon monoxide, containing all of the hydrocarbons boiling above 460° C., having a solidification point of 98° C., a penetration number of 1.1, and an average molecular size of $C_{48}$, was chlorinated until 5.4% chlorine had been absorbed. By the splitting off of hydrogen chloride and a treatment with zinc oxide and bleaching earth, there resulted an unsaturated paraffin mixture which contained 0.4% chlorine, solidified at 92° C. and had an iodine number of 29. By subjecting this mixture to the Oxo synthesis and a subsequent hydrogenation, there was obtained an alcohol-paraffin mixture which solidified at 92° C. and contained 55% of alcohols.

This alcohol-paraffin mixture was treated for 6 hours with 150% of the theoretically required quantity of caustic alkali. After the decomposition with dilute hydrochloric acid, washing, and drying, there remained a light yellow wax-acid-paraffin mixture, which contained 55% wax acids. The solidification point of this mixture was 92° C., while the penetration number was 1.3. A wax paste prepared therefrom with the use of slab paraffin and a mixture of solvent naphtha and turpentine had the following hardness values:

| Temperature, ° C | 20 | 25 | 30 |
|---|---|---|---|
| Penetration No | 4 | >200 | >200 |

This wax paste shows very unsatisfactory properties. If the wax-acid-paraffin mixture used is stirred with caustic lime (CaO) until the product contains 10% or 20% of calcium soaps, then wax pastes having the following hardness values are obtained:

| Temperature, ° C | 20 | 25 | 30 |
|---|---|---|---|
| Penetration No | 2 | 30 | >200 |

These wax pastes also have no satisfactory resistance to temperature changes.

If the wax-acid-paraffin mixture of this example is mixed with the same quantity by weight of the wax prepared in accordance with Example 1, then a wax is obtained which has a solidification point of 85° C. and a penetration number of 1.5. The wax paste prepared from this wax, slap paraffin, and a solvent naphtha-turpentine mixture in the proportions by weight mentioned in Example 1 had the following hardness values:

| Temperature, °C | 20 | 25 | 30 |
|---|---|---|---|
| Penetration No | 1 | 4 | 35 |

These figures indicate that it is possible in accordance with the invention to decisively improve a wax which is not satisfactory for the production of wax pastes.

*Example 6*

(a) A paraffin fraction boiling between 400° and 450° C., which had been obtained by distillation and contained all of the hydrocarbons of the molecular size of $C_{25}$–$C_{29}$ was chlorinated, while being irradiated, until 9.5% chlorine had been absorbed. The chlorination mixture was mixed with 1% active carbon and heated in a glass flask for 3 hours at about 300° C., while stirring, and passing through small amounts of nitrogen. After cooling, the reaction product was mixed with a mixture of 1% zinc oxide and 1% bleaching earth (tonsil) and again heated for 2 hours at about 200° C. After having filtered off the solid constituents, there was obtained a product which had an iodine number of 56 and contained 0.2% chlorine.

This olefinic hydrocarbon mixture was placed into a pressure vessel provided with a stirrer and treated for 1 hour with water gas at a temperature of 140–160° C. and a pressure of 180–200 kg. per square centimeter with the use of a cobalt catalyst. The aldehydes thereby formed were hydrogenated with hydrogen for 1 hour at 200–220° C., and a pressure of 140–150 kg. per square centimeter using a cobalt catalyst. After having filtered off the catalyst, there was obtained a faintly yellowish product which contained 55% of alcohols.

The alcohol-paraffin mixture thus obtained was mixed with 130% of the theoretically required quantity of caustic alkali and stirred in a pressure vessel for 3 hours at 350° C. Thereafter, the reaction product was decomposed with dilute hydrochloric acid. This mixture was then boiled several times with water to remove the last residues of mineral acid. After drying, there remained a light yellow wax-acid-paraffin mixture which contained 55% of wax acids. The mixture was stirred with caustic lime (CaO) at 100–140° C. while adding small amounts of water, until only 35% of free acids were present. The finished product prepared in this manner contained 45% paraffin, 35% free wax acids, and 20% lime acids.

(b) Hard paraffin from catalytic carbon monoxide hydrogenation containing all of the hydrocarbons boiling above 460° C. and having an average molecular size of $C_{48}$ was chlorinated until 5.4% chlorine had been absorbed. After the splitting off of hydrogen chloride and an after-treatment with zinc oxide and bleaching earth, there was obtained an olefin-paraffin mixture which had an iodine number of 29, and contained 0.4% chlorine. After the catalytic addition of water gas and subsequent hydrogenation effected under the conditions described in Example 6a, an alcohol-paraffin mixture was obtained which contained 55% alcohols.

This alcohol-parafin mixture was stirred with 150% of the theoretically required quantity of caustic alkali. By decomposition with dilute hydrochloric acid, washing, and drying, there resulted a light yellow wax-acid-paraffin mixture which contained 55% wax acids.

(c) Equal parts by weight of the partially saponified wax-acid-paraffin mixture prepared in accordance with Example 6a and of the wax-acid-paraffin mixture obtained in accordance with Example 6b were mixed. This resulted in a wax which had a solidification point of 86° C. and a penetration number of 3.5.

(d) A paste was prepared from 6 parts by weight of the partially saponified wax-acid-paraffin mixture prepared in accordance with Example 6a, 24 parts by weight of slab paraffin (Compes Type 201) and 70 parts by weight of a mixture consisting of 70% solvent naphtha (a petroleum fraction boiling between 130 and 190° C.) and 30% of American turpentine. The hardness of this paste was determined at different temperatures in the manner described in Example 1. The hardness of a wax paste prepared in the manner described above showed the following values:

| Temperature, °C | 20 | 25 | 30 |
|---|---|---|---|
| Penetration No | above 200 | above 200 | above 200 |

A wax paste prepared in the same manner from the wax-acid-paraffin mixture prepared in accordance with Example 6b, slab paraffin, solvent naphtha, and turpentine had the following hardness values:

| Temperature, °C | 20 | 25 | 30 |
|---|---|---|---|
| Penetration No | 4 | above 200 | above 200 |

A wax paste prepared from the wax-acid-paraffin mixture prepared in accordance with Example 6c, slab paraffin, solvent naphtha, and turpentine in the proportions by weight given above, showed the following hardness values:

| Temperature, °C | 20 | 25 | 30 |
|---|---|---|---|
| Penetration No | 7 | 10 | 30 |

This indicates clearly the extraordinary improvement of the resistance to temperature changes by mixing the wax acids in accordance with the invention.

*Example 7*

(a) The wax-acid paraffin mixture obtained in accordance with Example 6a was stirred for 30 minutes at about 20° C. with twice the quantity of acetone, and then filtered off from the extraction residue. Evaporation of the acetone resulted in 20% of extraction constituents. The light yellow extraction residue which was insoluble in acetone contained 45% of wax acids in addition to paraffins. This wax-acid-paraffin mixture was then treated with caustic lime (CaO) in such a manner that a finished product remained, which contained 55% paraffin, 20% lime soaps, and 25% free wax acids. The hardnesses of the pastes prepared from this product with the use of slab paraffin and a solvent naphtha-turpentine mixture were as follows:

| Temperature, °C | 20 | 25 | 30 |
|---|---|---|---|
| Penetration No | above 200 | above 200 | above 200 |

(b) Mixing of equal parts by weight of the partially saponified wax-acid-paraffin mixture in accordance with Example 7a and the wax-acid-paraffin mixture in accordance with Example 6b resulted in a wax which had a solidification point of 87° C. and a penetration number of 2.5. A wax paste produced therefrom showed the following hardness values:

| Temperature, °C | 20 | 25 | 30 |
|---|---|---|---|
| Penetration Number | 2 | 7 | 10 |

*Example 8*

Mixing of 1.5 parts by weight of the partially saponified wax-acid-paraffin mixture prepared according to Example 7a with 1.0 part by weight of the wax-acid-paraffin mixture prepared in accordance with Example 6b, resulted in a wax which had a solidification point of 85° C. and a penetration number of 3.8. A wax paste prepared from this wax, slab paraffin, and a solvent naphtha-turpentine mixture in the proportions set forth in Example 6d had the following hardness values:

| Temperature, °C | 20 | 25 | 30 |
|---|---|---|---|
| Penetration No | 3 | 5 | 8 |

These values, as well as the values given in Example 7b, indicate the considerable improvements with regard to resistance to temperature changes obtainable by mixing the different wax acids.

Example 9

(a) The product obtained in accordance with Example 6a after the treatment with alkali was extracted for 5 hours with ethylene chloride at 50° C. Evaporation of the solvent resulted in an extract which had a neutralization number of 2. The extraction residue was decomposed with dilute sulfuric acid, washed several times with water, and then dried. A light yellow wax acid which still contained about 5% paraffins was obtained thereby.

This concentrated wax acid was stirred with caustic lime (CaO) until 20% lime soaps were contained in the finished product. A wax paste prepared from this product with the use of slab paraffin, solvent naphtha, and turpentine in the proportions given in Example 6d, had the following hardness values:

| Temperature, ° C | 20 | 25 | 30 |
|---|---|---|---|
| Penetration No | 50 | above 200 | above 200 |

(b) Equal parts by weight of the partially saponified wax-acid-paraffin mixture prepared in accordance with Example 9a and of the wax-acid-paraffin mixture obtained in accordance with Example 6b, were mixed. This resulted in a wax which had a solidification point of 90° C. and a penetration number of 4.5. A wax paste prepared from this product, slab paraffin, solvent naphtha, and turpentine in the proportions mentioned in Example 6d had the following hardness values:

| Temperature, ° C | 20 | 25 | 30 |
|---|---|---|---|
| Penetration No | 2 | 7 | 12 |

These figures also indicate the surprising improvements obtainable by mixing the wax acids and wax-acid-paraffin mixtures in accordance with the invention.

Example 10

A mixture was prepared from equal parts by weight of the partially saponified wax-acid-paraffin mixture of Example 7a and a wax-acid-paraffin mixture which had been obtained by chlorination, dehydrochlorination, Oxo synthesis, and a treatment with alkali of a paraffin fraction which contained all of the hydrocarbons having a solidification point of 75–80° C. corresponding to the molecular size of $C_{36}$–$C_{40}$. This wax-acid-paraffin mixture contained 61% wax acid. By mixing this mixture with the partially saponified mixture of Example 7a, there was obtained a wax which solidified at 66° C. and had a penetration number of 3.1. A wax paste prepared from this wax, slab paraffin, solvent naphtha, and turpentine had the following hardness values:

| Temperature, ° C | 20 | 25 | 30 |
|---|---|---|---|
| Penetration No | 5 | 8 | 20 |

Example 11

A mixture was prepared from equal parts by weight of the partially saponified wax-acid-paraffin mixture of Example 6a and a wax-acid-paraffin mixture which contained 60% of free wax acids and had been produced by subjecting a paraffin fraction of the molecular size $C_{40}$–$C_{44}$ and a solidification point of 80–85° C. to chlorination, dehydrochlorination, Oxo synthesis, hydrogenation, and a treatment with alkali. This resulted in a wax which had a solidification point of 72° C. and a penetration number of 3.2. A wax paste produced from this wax, slab paraffin, solvent naphtha, and turpentine in the proportions previously mentioned, had the following hardness values:

| Temperature, ° C | 20 | 25 | 30 |
|---|---|---|---|
| Penetration No | 5 | 13 | 26 |

Example 12

(a) A paraffin obtained by catalytic carbon monoxide hydrogenation and containing all of the hydrocarbons of the molecular size $C_{24}$–$C_{30}$ with the average carbon number being $C_{27}$ was chlorinated, while irradiating, until 4.3% chlorine had been absorbed. The dehydrochlorination and the removal of the residual chlorine content with zinc oxide and bleaching earth was effected in accordance with Example 6a. The faintly yellow olefin-paraffin mixture contained 0.1% chlorine and had an iodine number of 28. The reaction conditions of the Oxo synthesis and of the subsequent hydrogenation correspond to those of Example 6a. After the separation of the cobalt catalyst there was obtained a light yellow alcohol-paraffin mixture containing 35% alcohols.

This alcohol-paraffin mixture was stirred for 4 hours at about 350° C. with 150% of the theoretically required quantity of caustic alkali. After the decomposition with dilute hydrochloric acid, washing, and drying, there remained a mixture which contained 35% wax acids in addition to paraffins. Stirring of this wax-acid-paraffin mixture for 30 minutes at 20° C. with twice the quantity of acetone, resulted in 13% extract and in a light yellow extraction residue which contained 25% wax acids in addition to paraffin.

The extracted wax-acid-paraffin mixture was stirred with caustic lime (CaO) until only 10% of free wax acids were present. There was obtained a finished product which contained 75% paraffin, 15% lime soaps, and 10% wax acids.

A paste prepared from this partially saponified wax-acid-paraffin mixture, slab paraffin, solvent naphtha, and turpentine in the proportions mentioned in Example 6d, had the following hardness values:

| Temperature, ° C | 20 | 25 | 30 |
|---|---|---|---|
| Penetration No | above 200 | above 200 | above 200 |

(b) A wax prepared by mixing equal parts by weight of the partially saponified wax-acid-paraffin mixture produced in accordance with Example 12a and of the wax-acid-paraffin mixture of Example 6b had a solidification point of 81° C. and a penetration number of 1.9. The hardnesses of a wax paste prepared from this wax, slab wax, solvent naphtha, and turpentine, were as follows:

| Temperature, ° C | 20 | 25 | 30 |
|---|---|---|---|
| Penetration No | 4 | 7 | 14 |

These values also indicate that waxes which are suited for the production of pastes cannot be prepared from paraffins of the molecular size of $C_{24}$–$C_{30}$ merely by subjecting the latter to chlorination, dehydrochlorination, Oxo synthesis, hydrogenation, and a treatment with alkali. Starting materials for wax pastes which are unaffected by temperature changes can only be produced by a combination with wax acids, the molecular size of which ranges above $C_{40}$.

Example 13

(a) A petroleum slab paraffin having a setting point of 63° C. and substantially containing only hydrocarbons of the molecular size $C_{31}$–$C_{40}$ with the average molecular size being $C_{35}$ was chlorinated with irradiation until 5.1% chlorine had been absorbed. After the addition of 1% active carbon, the chlorination mixture was heated for 6 hours at 300° C. in a glass flask while stirring and passing through small amounts of nitrogen. After having filtered off the solid constituents a product was obtained which had an iodine number of 32 and a chlorine content of 0.2%.

This olefinic hydrocarbon mixture, in a pressure vessel provided with stirrer, was treated with water gas for 1 hour at 140–160° C. and a pressure of 180–200 kg. per square centimeter using a cobalt catalyst. The aldehydes thereby formed were hydrogenated for 1 hour with hydrogen at 180–200° C. and a pressure of 140–150 kg. per square centimeter with the use of a cobalt catalyst. After having filtered off the catalyst, a weakly yellowish product was obtained which contained 55% alcohols.

The alcohol-paraffin mixture thus obtained was mixed with 150% of the theoretically required quantity of caustic potassium and stirred in a pressure vessel for 6 hours at 350° C. Thereafter, the reaction product was decomposed with dilute hydrochloric acid. It was then boiled several times to remove the last residues of mineral acid. After drying, there remained a light yellow wax acid-paraffin mixture which contained 55% of wax acids. The mixture, while adding small amounts of water, was stirred at 100–140° C. with CaO until only 25% of free acids were still present. The finished product thus prepared contained 45% paraffin, 25% free wax acids and 30% calcium soaps.

(b) Hard paraffin from the catalytic carbon monoxide hydrogenation which substantially contained only hydrocarbons boiling above 450° C. and had an average carbon number of $C_{45}$ was chlorinated until 3.9% of chlorine had been absorbed. After the splitting-off of hydrogen chloride, there was obtained an olefin-paraffin mixture which had an iodine number of 22 and contained 0.2% chlorine. The catalytic addition of water gas and hydrogenation carried out under the conditions set forth in Example 13a resulted in an alcohol-paraffin mixture which contained 45% alcohols.

This alcohol-paraffin mixture was stirred for 6 hours at 350° C. with 150% of the theoretically required quantity of caustic alkali. Decomposition with dilute hydrochloric acid, washing and drying resulted in a light yellow wax acid-paraffin mixture which contained 45% wax acids.

(c) A mixture was prepared from 0.5 part by weight of the partially saponified wax acid-paraffin mixture prepared in accordance with Example 13a and 1.0 part by weight of the wax acid-paraffin mixture obtained in accordance with Example 13b. This resulted in a wax which had a setting point of 90° C. and a penetration number of 1.2.

(d) A paste was made from 6 parts by weight of the wax obtained in accordance with Example 13c, 24 parts by weight of slab paraffin having a setting point of 52° C., and 70 parts by weight of solvent naphtha. The determination of the hardness of this paste resulted in the following values:

| Temperature, ° C | 20 | 25 | 30 |
|---|---|---|---|
| Penetration No | 1 | 5 | 10 |

*Example 14*

(a) A petroleum slab paraffin substantially containing only hydrocarbons of a molecular size of $C_{25}$–$C_{35}$ with the average molecular size being $C_{29}$, and having a setting point of 57° C. was chlorinated with irradiation until 6.1% chlorine had been absorbed. The dehydro-chlorination was effected in accordance with Example 13a. The weakly yellow olefin-paraffin mixture had a chlorine content of 0.1% and an iodine number of 38. The reaction conditions of the Oxo synthesis and of the subsequent hydrogenation corresponded to those of Example 13a. After the separation from the cobalt catalyst, a light yellow alcohol-paraffin mixture having an alcohol content of 52% was obtained.

This alcohol-paraffin mixture was stirred for 6 hours at 350° C. with 130% of the theoretically required quantity of caustic alkali. Decomposition with dilute hydrochloric acid, washing and drying resulted in a mixture which, in addition to paraffin, contained 52% of wax acids.

The wax acid-paraffin mixture was stirred with caustic lime (CaO) until only 22% of free wax acids were present. This resulted in a finished product which contained 48% paraffin, 30% calcium soaps and 22% wax acids.

(b) Mixing of 0.5 part by weight of the partially saponified wax acid-paraffin mixture obtained in accordance with Example 14a and 1.0 part by weight of the wax acid-paraffin mixture obtained according to Example 13b resulted in a wax which had a setting point of 89° C. and a penetration number of 1.5. A wax paste prepared from this wax, slab paraffin and solvent naphtha in the proportions by weight given in Example 13d had the following hardness:

| Temperature, ° C | 20 | 25 | 30 |
|---|---|---|---|
| Penetration No | 2 | 6 | 12 |

We claim:

1. A new wax component for a substantially temperature-stable wax paste consisting of wax acid-paraffin mixtures having a molecular size of at least $C_{25}$, the wax acid portion of which has been obtained from paraffin hydrocarbons by chlorination, dehydrochlorination of the chlorination products, catalytic addition of water gas to the unsaturated hydrocarbon mixtures thereby formed, hydrogenation of the products obtained by the water gas addition, treatment of the hydrogenation products with molten alkali and treatment of the products of the alkali treatment with mineral acid, and has been partially saponified with calcium oxide in relation to the molecular size of the wax acid-paraffin mixture in accordance with the following table of the group consisting of (a) where the wax acid paraffin mixture has a molecular size of $C_{30}$–$C_{40}$, the acid portion thereof is saponified to an extent that about 10–20% of calcium soap is present in the mixture; (b) where the wax acid-paraffin mixture has a molecular size of $C_{25}$–$C_{30}$, the acid portion thereof is saponified with calcium oxide in amount sufficient that the wax acid-paraffin mixture has a content of about 10–30% of calcium soap, and sufficient unsaponified wax acid-paraffin mixtures having a molecular size above $C_{30}$ is admixed therewith so that 0.7–3 parts by weight of the partially saponified wax acid-paraffin mixture having the molecular size of $C_{25}$–$C_{30}$ is present per part by weight of said unsaponified wax acid-paraffin mixture having the molecular size above $C_{30}$; (c) where the wax acid-paraffin mixture has a molecular size of $C_{25}$–$C_{40}$ the partial saponification with calcium oxide is effected to the extent that the partially saponified wax acid-paraffin mixture has a calcium soap content of from more than 30% to about 50% and admixed thereto is an unsaponified wax acid-paraffin mixture of molecular size above $C_{30}$ to an extent that 0.2–1 part by weight of said partially saponified wax acid-paraffin mixture of molecular size of $C_{25}$–$C_{40}$ is present per part by weight of said unsaponified wax acid-paraffin mixture of molecular size above $C_{30}$.

2. Wax component according to claim 1, in which said wax acid-paraffin mixture having a molecular size of $C_{30}$–$C_{40}$ and partially saponified with calcium oxide contains unsaponified wax acid-paraffin mixtures having a molecular size of above $C_{40}$.

3. Wax component according to claim 1, in which said wax acid-paraffin mixture having a molecular size of $C_{30}$–$C_{40}$ has a paraffin content of about 50%.

4. Wax component according to claim 1, in which said wax acid-paraffin mixture having a molecular size of $C_{30}$–$C_{40}$ has been freed from 10–20% of the low pour point portions.

5. Wax component according to claim 1, in which said wax acid-paraffin mixture having a molecular size of $C_{25}$–$C_{30}$ is freed from 10–30% of the low pour point portions.

6. Wax according to claim 1, in which said wax component acid-paraffin mixture having a molecular size of above $C_{30}$ is prepared from hard paraffins from carbon monoxide hydrogenation.

7. Process for the production of wax components for a substantially temperature-stable wax paste consisting of wax acid-paraffin mixtures having a molecular size of at least $C_{25}$, which comprises partially saponifying the wax acid portion of a wax acid-paraffin mixture produced from paraffin hydrocarbons by chlorination, dehydrochlorination of the chlorination products, catalytic addition of water gas to the unsaturated hydrocarbon mixtures thus formed, hydrogenation of the products obtained by said water gas addition, treatment of the hydrogenation products with molten alkali and treatment of the products of the alkali treatment with mineral acids, with calcium oxide in relation to the molecular size of the wax acid-paraffin mixture in accordance with the following table of the group consisting of (a) where the wax acid-paraffin mixture has a molecular size of $C_{30}$–$C_{40}$, the acid portion thereof is saponified to an extent that about 10–20% of calcium soap is present in the mixture; (b) where the wax acid-paraffin mixture has a molecular size of $C_{25}$–$C_{30}$, the acid portion thereof is saponified with calcium oxide in amount sufficient that the wax acid-paraffin mixture has a content of about 10–30% of calcium soap, and sufficient unsaponified wax acid-paraffin mixtures having a molecular size above $C_{30}$ is admixed therewith so that 0.7–3 parts by weight of the partially saponified wax acid-paraffin mixture having the molecular size of $C_{25}$–$C_{30}$ is present per part by weight of said unsaponified wax acid-paraffin mixture having the molecular size above $C_{30}$; (c) where the wax acid-paraffin mixture has a molecular size of $C_{25}$–$C_{40}$ the partial saponification with calcium oxide is effected to the extent that the partially saponified wax acid-paraffin mixture has a calcium soap content of from more than 30% to about 50% and admixed thereto is an unsaponified wax acid-paraffin mixture of molecular size above $C_{30}$ to an extent that 0.2–1 part by weight of said partially saponified wax acid-paraffin mixture of molecular size of $C_{25}$–$C_{40}$ is present per part by weight of said unsaponified wax acid-paraffin mixture of molecular size above $C_{30}$.

8. Process according to claim 7, in which said partial saponification with calcium oxide is effected at temperatures of 100–150° C.

References Cited in the file of this patent

UNITED STATES PATENTS

| Number | Name | Date |
|---|---|---|
| 1,780,633 | Pungs | Nov. 4, 1930 |
| 1,971,305 | Pungs | Aug. 21, 1934 |
| 1,972,459 | Pungs | Sept. 4, 1934 |
| 2,231,486 | Taggart | Feb. 11, 1941 |
| 2,293,649 | Howk | Aug. 18, 1942 |
| 2,483,259 | Budner et al. | Sept. 27, 1949 |
| 2,594,341 | Owen et al. | Apr. 29, 1952 |
| 2,614,049 | Swanson | Oct. 14, 1952 |
| 2,672,476 | Hujsak et al. | Mar. 16, 1954 |

U. S. DEPARTMENT OF COMMERCE
PATENT OFFICE
CERTIFICATE OF CORRECTION

Patent No. 2,821,484                            January 28, 1958

Helmut Kolling et al.

It is hereby certified that error appears in the printed specification of the above numbered patent requiring correction and that the said Letters Patent should read as corrected below.

Column 5, line 74, in the table, fourth column thereof, for the numeral "6" read --9--; column 6, line 75, for "slap" read --slab--.

Signed and sealed this 22nd day of April 1958.

(SEAL)
Attest:
KARL H. AXLINE

Attesting Officer

ROBERT C. WATSON
Commissioner of Patents